United States Patent [19]

Mori

[11] Patent Number: 4,687,156

[45] Date of Patent: Aug. 18, 1987

[54] LOCK MECHANISM FOR WEBBING RETRACTOR

[75] Inventor: Shinji Mori, Aichi, Japan

[73] Assignee: Kabushiki Kaisha Tokai-Rika-Denki-Seisakusho, Aichi, Japan

[21] Appl. No.: 844,584

[22] Filed: Mar. 27, 1986

[30] Foreign Application Priority Data

Mar. 29, 1985 [JP] Japan .................................. 60-46251

[51] Int. Cl.⁴ ........................ A62B 35/02; B65H 75/48
[52] U.S. Cl. ......................... 242/107.4 A; 242/107.4 B
[58] Field of Search ................. 242/107.4 R, 107.4 A, 242/107.4 B, 107.4 C; 297/476, 478; 280/806, 807

[56] References Cited

U.S. PATENT DOCUMENTS

| | | | |
|---|---|---|---|
| 4,438,551 | 3/1984 | Imai | 242/107.4 A |
| 4,467,981 | 8/1984 | Mori et al. | 242/107.4 A |
| 4,483,495 | 11/1984 | Honi | 242/107.4 A |
| 4,573,646 | 3/1986 | Willey | 242/107.4 A |

*Primary Examiner*—Stuart S. Levy
*Assistant Examiner*—David Werner
*Attorney, Agent, or Firm*—Sixbey, Friedman & Leedom

[57] ABSTRACT

A lock mechanism for a webbing retractor employed in a seatbelt system for a vehicle designed to protect an occupant in an emergency situation of the vehicle. A ratchet wheel is provided coaxially with a lock ring adapted for stopping, when an emergency situation of the vehicle occurs, the rotation of a webbing take-up shaft in a direction in which the webbing is unwound. A lever which is activated by the action of an acceleration sensor is engageable with both the ratchet wheel and the lock ring. The rotation of the take-up shaft is transmitted to the ratchet wheel through friction. When the vehicle is in a normal state, the ratchet wheel is rotatable together with the take-up shaft and gives no resistance to the rotation of the take-up shaft. When the webbing is wound up in a state wherein the lever is engaged with the lock ring, the ratchet wheel pushes out the lever so as to disengage from the lock ring. Accordingly, it is possible to prevent the webbing from being undesirably wound up and tightened when the vehicle is running on a rough road.

20 Claims, 17 Drawing Figures

LOCK MECHANISM FOR WEBBING RETRACTOR

BACKGROUND OF THE INVENTION

1. Field of the Invention

The present invention relates to a lock mechanism for a webbing retractor which is employed in a seatbelt system for a vehicle designed to protect an occupant in an emergency situation of the vehicle, the lock mechanism being adapted for preventing an occupant restraining webbing from being unwound when an emergency situation of the vehicle occurs.

2. Description of the Related Art

In a typical seatbelt system for a vehicle, an occupant restraining webbing is wound up into a retractor from one end thereof by means of a predetermined biasing force, and the retractor incorporates a lock mechanism adapted for preventing the webbing from being unwound when an emergency situation of the vehicle occurs.

One type of conventional lock mechanism is arranged as follows. Namely, a lock ring is provided on a frame in such a manner as to follow the rotation of a webbing take-up shaft in a direction in which the webbing is unwound therefrom, with a resilient member interposed between the lock ring and the take-up shaft. When an emergency situation of the vehicle occurs, an acceleration sensing means acts to resist the rotation of the lock ring, so that a lock means which is adapted to rotate together with the take-up shaft is activated to rotate with a delay with respect to the rotation of the take-up shaft so as to engage with lock teeth provided on the frame, thus locking the webbing retractor (see the specifications of Japanese Patent Publication No. 16969/1969 and Japanese Patent Laid-Open No. 1115/1972).

This type of conventional lock mechanism suffers, however, the following problems.

When the vehicle is running on a rough road, the acceleration sensing means may be maintained in an operative state, and in such a case, the lock mechanism is held in the locking position, so that it is not possible for the occupant to unwind the webbing. In addition, when the vehicle is running on a rough road, the occupant's body is repeatedly moved up and down by vibrations of the vehicle, causing the webbing to be repeatedly wound in and out of the retractor. In consequence, as the webbing is wound up, the position at which a lock member of the lock means and the lock teeth engage with each other gradually progresses in a direction in which the webbing is wound up into the retractor, resulting in an increase in the pressure applied to the occupant's body from the webbing.

In order to overcome these disadvantages, the applicant of the present invention has already proposed a lock mechanism for a webbing retractor which has no risk of the webbing being gradually wound up into the retractor even when the webbing is repeatedly wound in and out by a given length (see the specification of Japanese Utility Model Application No. 003858/1985).

This proposed lock mechanism is arranged such that the rotation of a webbing take-up shaft is transmitted to a friction member through friction. Thus, when the take-up shaft rotates in a direction in which the webbing is wound up, the friction member is activated to cause a pawl lever to separate from a lock ring, thereby preventing the webbing from being wound up.

However, this friction member is allowed to turn only through an angle within a predetermioned range, and the take-up shaft alone rotates after the friction member has rotated a given angle. For this reason, a portion of the friction member which is brought into contact with the take-up shaft causes friction to resist the rotation of the take-up shaft. In order to cope with this resistance to the rotation of the take-up shaft, it is necessary to increase the biasing force of a spiral spring for winding up the webbing.

SUMMARY OF THE INVENTION

In view of the above-described circumstances, it is a primary object of the present invention to provide a lock mechanism for a webbing retractor which is so designed that no resistance is applied to the rotation of the take-up shaft for winding in and out the webbing, and there is no risk of the webbing being undesirably wound up when the vehicle is running on a rough road.

To this end, the present invention provides a lock mechanism for a webbing retractor which comprises: a take-up shaft for winding up a webbing by means of a biasing force; a lock ring adapted to rotate together with the take-up shaft when rotated in a direction in which the webbing is unwound; stopper means adapted to engage with the lock ring when the acceleration acting on the vehicle exceeds a predetermined value, so as to delay the rotation of the lock ring with respect to the rotation of the take-up shaft in the direction in which the webbing is unwound; lock means for stopping the rotation of the take-up shaft in the direction in which the webbing is unwound when the rotation of the lock ring has adequately been delayed with respect to the rotation of the take-up shaft; and a ratchet wheel to which the rotation of the take-up shaft is transmitted through friction in such a manner that the ratchet wheel is rotable together with the take-up shaft without applying any resistance to the rotation of the take-up shaft, the ratchet wheel being adapted to be engaged with the stopper means when the acceleration acting on the vehicle exceeds a predetermined value and before the stopper means engages with the lock ring, so that, when the ratchet wheel in this state is rotated in the direction in which the webbing is wound up, the ratchet wheel pushes out the stopper means so as to disengage from the lock ring.

By virtue of this arrangement, the ratchet wheel rotates together with the take-up shaft when the vehicle is in a normal state. There is, therefore, no frictional resistance to the rotation of the take-up shaft, and it is necessary to increase the force required for the take-up shaft to wind up the webbing.

In addition, when the delay means and the lock ring are in engagement with each other while the vehicle is running on a rough road, the ratchet wheel rotates together with the take-up shaft when rotated in a direction in which the webbing is wound up, and pushes the stopper means by the back surface of a tooth portion of the ratchet wheel in the radial direction thereof, thereby disengaging the stopper means from the lock ring.

The lock ring is biased in a direction in which the webbing is unwound when the webbing retractor is in a locked state. Therefore, at the same time as the stopper means is disengaged from the lock ring, it starts to rotate in the direction in which the webbing is unwound.

Accordingly, when the webbing is unwound subsequently, the lock ring engages with the stopper means at the same position as in the case of the first locking operation, or the lock ring is rotated in the webbing unwinding direction in response to the rotation of the take-up shaft and engages with the stopper means in this state. Thus, even when a given length of the webbing is wound in and out a plurality of times, there is no risk of the webbing being gradually wound up and applying a pressure to the occupant's body.

BRIEF DESCRIPTION OF THE DRAWINGS

FIGS. 8(A) to 8(E) show in combination the operations of the friction spring and a pawl lever, together with their associated parts or elements;

FIGS. 9(A) to 9(D) respectively show modifications of the embodiment in which other kinds of members are employed as means for applying friction between a rotor and the ratchet wheel.

DESCRIPTION OF THE PREFERRED EMBODIMENT

The present invention will be described hereinunder in detail with reference to the accompanying drawings.

Figure 1:
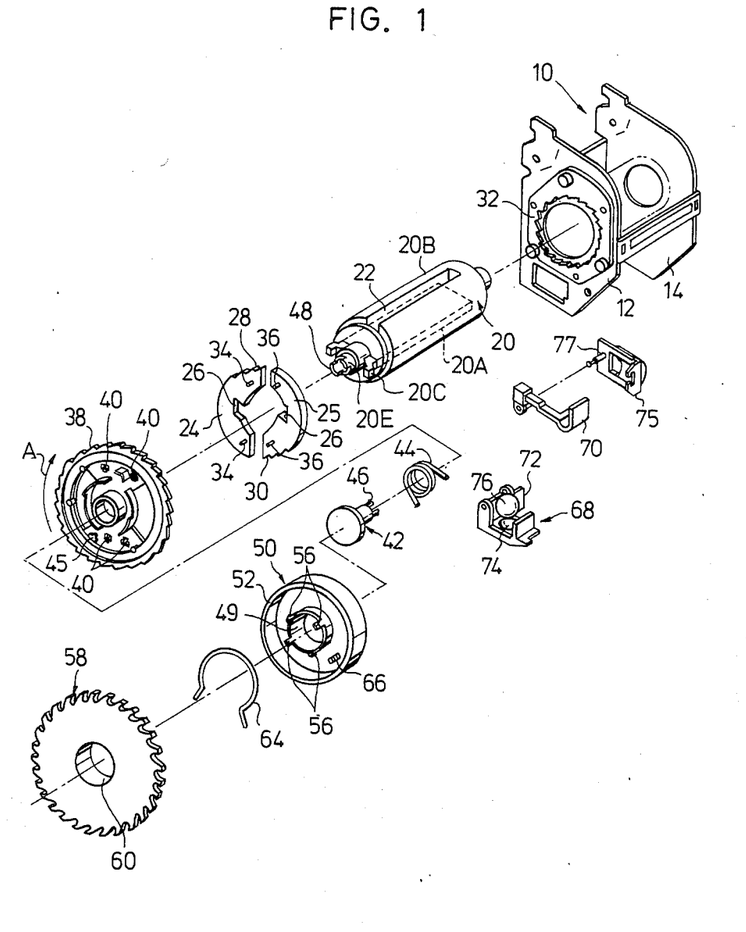
FIG. 1 is an exploded perspective view of a webbing retractor to which one embodiment of the lock mechanism according to the present invention is applied.

Referring first to FIG. 1 which is an exploded perspective view of a webbing retractor to which one embodiment of the lock mechanism according to the present invention is applied, the retractor has a frame 10 which is secured to the body of a vehicle by means of mounting bolts (not shown). A pair of parallel leg plates 12 and 14 respectively extend from two lateral side portions of the frame 10.

Figure 2:
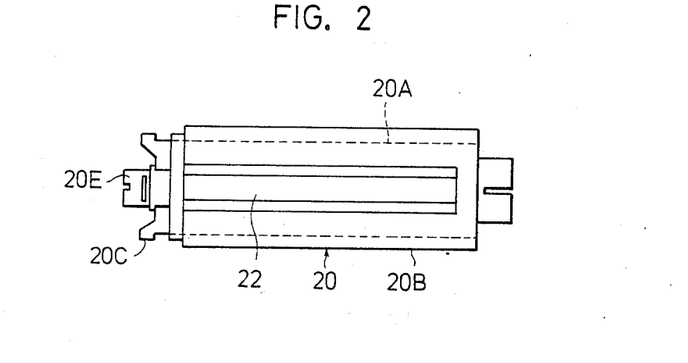
FIG. 2 is a side view of a take-up shaft of the retractor.

A take-up shaft 2, which is also shown in FIG. 2, is rotatably supported by these leg plates 12 and 14. The take-up shaft 20 is provided in the center thereof with a through-hole 22 which radially extends therethrough. One end of an occupant restraining webbing (not shown) is retained by the through-hole 22. This webbing 20 is wound up in layers on the take-up shaft 20 and has tongue plate connected to the other end thereof. By engaging this tongue plate with a buckle device mounted on the vehicle body, the occupant can be fastened by the intermediate portion of the webbing.

The take-up shaft 20 is composed of a core 20A made from a thick-walled plate material and a synthetic resin layer 20B formed around the core 20A by an integral molding process so that the take-up shaft 20 has a columnar outer shape.

A spiral spring (not shown) is retained by one end portion (closer to the leg plate 14) of the synthetic resin layer 20B, so that the take-up shaft 20 is biased in a direction in which the webbing is wound up.

One end portion of the core 20A projects from the other end portion of the synthetic resin layer 20B, thereby providing a projecting portion 20C.

Figure 3:
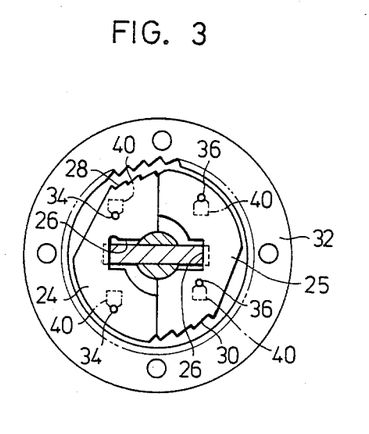
FIG. 3 is a front view showing the relationship between lock plates and and an internally-toothed ratchet wheel in accordance with the present invention.

Lock plates 24 and 25 which constitute a part of lock means shown in FIG. 1 are disposed around the projecting portion C. Each of the lock plates 24 and 25 is provided in the center thereof with a notch 26 having a substantially U-shaped cross-section, and consequently has a substantially C-shaped cross-section as a whole. The projecting portion 20C extends into the notches 26, thereby allowing the lock plates 24 and 25 to rotate together with the take-up shaft 20. The width of each notch 26 is made slightly larger than the width of the projecting portion 20C, as shown in FIG. 3, so that the lock plates 24 and 25 are rotatable relative to the take-up shaft 20 through only a predetermined angle.

A pawl portion 28 is formed at one end of the lock plate 24, and a pawl portion 30 at one end of the lock plate 25, these pawl portions 28 and 30 opposing lock teeth provided on an internally-toothed ratchet wheel 32 which is secured to the leg plate 12.

In addition, a pair of pins 34 project from the lock plate 24, and a pair of pins 36 project from the lock plate 25, these pins being respectively inserted into slots 40 which are provided in a lock ring 38. This lock ring 38 is rotatably supported on a smaller-diameter shaft portion 20E which projects from the axial center of the take-up shaft 20 so that the lock ring 38 is rotable relative to the take-up shaft 20.

A torsion coil spring 44 is coaxially supported on the lock ring 38. One end portion of the spring 44 is secured to a rotary wheel 42 fitted on the distal end of the smaller-diameter shaft portion 20E so that this end portion of the spring 44 is movable together with the wheel 42, while the other end portion of the spring 44 abuts against a retainer pin 45 which projects from the lock ring 38. The force from the torsion coil spring 44 biases the lock ring 38 so as to rotate in a direction in which the take-up shaft 20 unwinds the webbing (the direction indicated by the arrow A in FIG. 1). Accordingly, the lock ring 38 is biased by the force of the spring 44 so that each of the pins 34 and 36 of the lock plates 24 and 25 is accommodated in one end portion of the corresponding slot 40, thereby separating the pawl portions 28 and 30 from the lock teeth of the internally-toothed ratchet wheel 32, as shown in FIG. 3.

Figure 4:
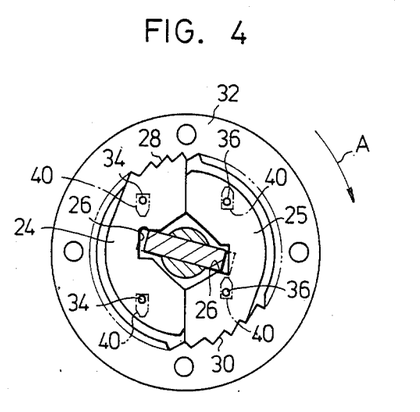
FIG. 4 shows the lock plates and the ratchet wheel, shown in FIG. 3, in their operative state.
Figure 5:
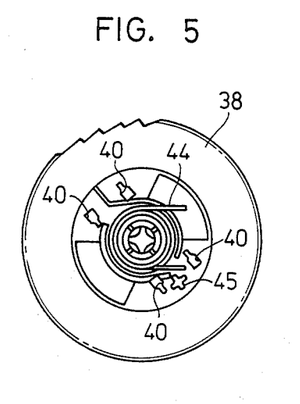
FIG. 5 shows a lock ring and a torsion coil spring in their assembled state.

However, when relative rotation is generated between the lock ring 38 and the take-up shaft 20 rotating in the webbing unwinding direction (indicated by the arrow A), the rotation of the lock ring 38 is delayed against the biasing force applied from the torsion coil spring 44. At this time, the lock ring 38 guides the lock plates 24 and 25 in the longitudinal direction of the slots 40, thus causing the pawl portions 28 and 30 to engage with the lock teeth of the internally-toothed ratchet wheel 32, as shown in FIG. 4.

Figure 6:
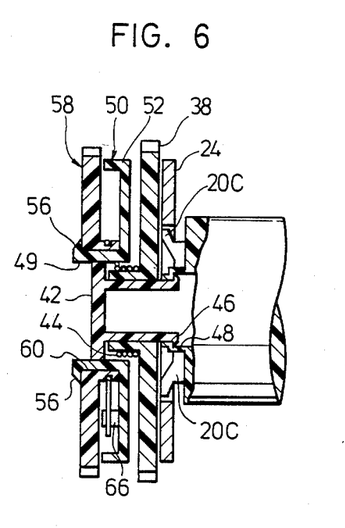
FIG. 6 is a sectional view showing various members mounted on the take-up shaft.

Referring to FIG. 6, the rotary wheel 42 is retained by the take-up shaft 20 through a pair of retainer pawls 46 which enter a rectangular bore 48 provided in the take-up shaft 20 and which engage with the peripheral edge of the bore 48, whereby the rotary wheel 42 is made rotatable together with the take-up shaft 20 in one unit.

The outer periphery of the rotary wheel 42 is secured to a cylindrical portion 49 provided at the axial center of a rotor 50, so that the rotor 50 is rotable with the rotary wheel 42. Accordingly, the first-mentioned end of the torsion coil spring 44 is retained by a groove 51 (shown in FIG. 8) provided in the inner peripheral surface of a through-hole defined inside the cylindrical portion 49.

A rib 52 is formed along the peripheral edge of the rotor 50, and four pawls 56 are provided at the distal end of the cylindrical portion 49 so as to be equally spaced along the peripheral edge of the portion 49, the distal end portion of each pawl 56 being bent so as to extend toward the rib 52.

The cylindrical portion 49 is inserted into and rotatably supported by a cylindrical portion 60 of a ratchet wheel 58, the portion 49 being retained through the pawls 56. The ratchet wheel 58 is prevented by the pawls 56 from coming off the rotor 50.

Figure 7:
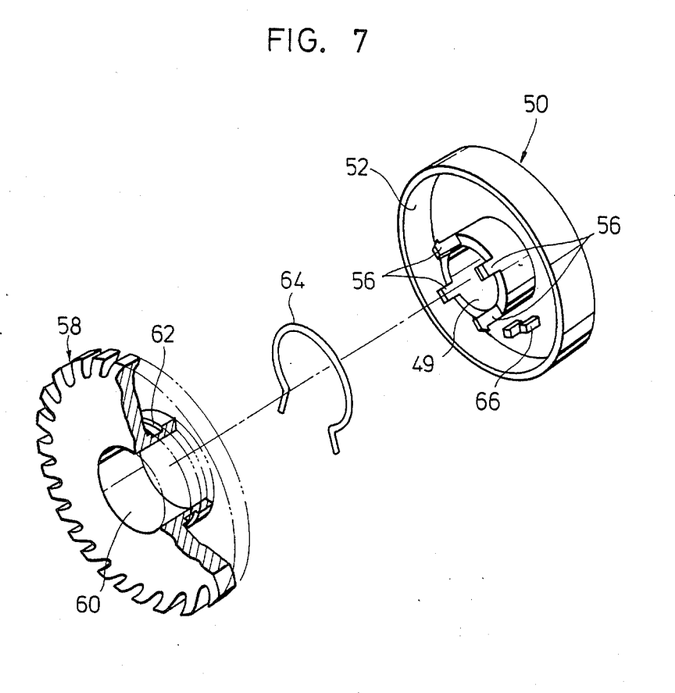
FIG. 7 is a perspective view showing the way in which the ratchet wheel and a friction spring are assembled together.

As shown in FIG. 7, a ring groove 62 is provided in the outer periphery of the cylindrical portion 60 of the ratchet wheel 58, and a circular friction spring 64 is fitted into the groove 62.

One end portion of this spring 64 is retained by a retaining portion 66 which is formed on the rotor 50. In consequence, the rotational force of the rotor 50 is transmitted to the ratchet wheel 58 through the friction applied by the friction spring 64.

Figure 8:
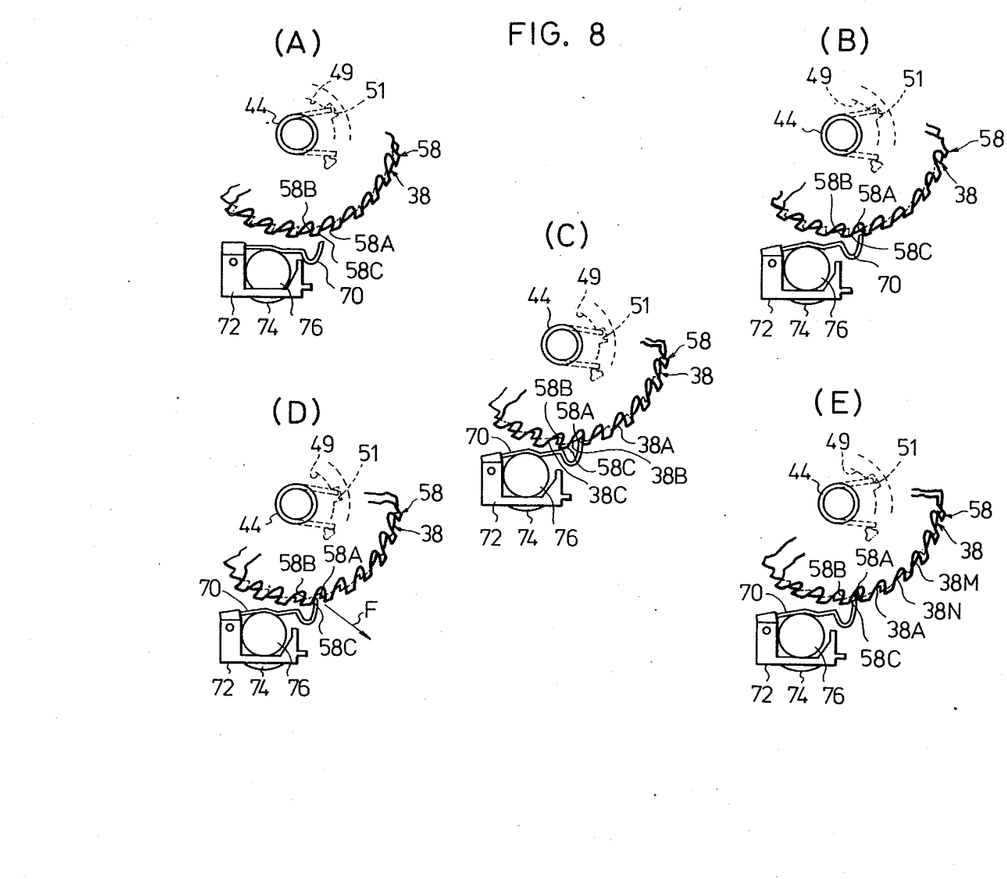

The radius of the ratchet wheel 58, i.e., the distance between the center and the distal end of the toothed portion of ratchet wheel 58, is set such as to be slightly larger than that of the lock ring 38, so that a pawl lever 70 which is pivoted by the action of an acceleration sensor 68 first engages with the ratchet wheel 58. In addition, the back surface 58C of each of the teeth provided on the ratchet wheel 58 is slanted so that, when the ratchet wheel 58 which is in engagement with the pawl lever 70 at a tooth portion 58A shown in FIG. 8 is rotated in the direction in which the webbing is wound up, the slanted back surface 58C of a tooth portion 58B causes the pawl lever 70 to pivot clockwise so as to be pushed out and thereby disengaged from the lock ring 38.

The acceleration sensor 68 is arranged such that a ball 76 is disposed within a conical accommodating portion 74 which is provided on a casing 72, and when the acceleration acting on the vehicle exceeds a predetermined value, the ball 76 goes up the conical accommodating portion 74.

The pawl lever 70 is pivotally supported by a pin 77 which is secured to a mounting bracket 75 which is in turn secured to the leg plate 12. The pawl lever 70 is disposed in such a manner that the intermediate portion thereof is contacted by the ball 76.

When the ball 76 is pushed up, the pawl lever 70 is pivoted by the movement of the ball 76, thus causing the distal end portion of the pawl lever 70 to engage with the ratchet wheel 58 and the lock ring 38.

When the pawl lever 70 is in engagement with both the ratchet wheel 58 and the lock ring 38, if the take-up shaft 20 rotates in the webbing winding-up direction (opposite to the direction indicated by the arrow A in FIG. 1), the rotor 50 rotates together with the rotary wheel 42. In consequence, the ratchet wheel 58 also rotates in the same direction by virtue of the frictional force applied by means of the friction spring 64.

The following is a description of the operation of the above-described embodiment.

When the vehicle is in a normal state, the pawl lever 70 is separated from both the ratchet wheel 58 and the lock ring 38, as shown in FIG. 8(A). Therefore, the occupant having the webbing fastened can unwind and rewind the webbing from and onto the take-up shaft 20 so as to assume a desired driving posture.

When the vehicle runs into an emergency situation such as a collision, the ball 76 goes up the conical accommodating portion 74, thus causing the pawl lever 70 to pivot in such a manner that the pawl lever 70 first engages with the tooth portion 58A of the ratchet wheel 58, thereby stopping the rotation of the ratchet wheel 58, and then engages with the lock ring 38, as shown in FIG. 8(B).

If the tooth portion 58A is also shaped so as to slant with respect to the pawl lever 70, it is possible to produce a force, when the pawl lever 70 abuts against the tooth portion 58A, which allows the pawl lever 70 to engage with the lock ring 38.

Since the occupant's body is moved by inertia in the direction in which the acceleration acts, the webbing is unwound from the take-up shaft 20, thus causing the take-up shaft 20 rotates clockwise as viewed in FIG. 8. In consequence, the lock ring 38, which rotates together with the take-up shaft 20, is prevented from rotating by the pawl lever 70, so that relative rotation is generated between the lock ring 38 and the take-up shaft 20.

This relative rotation causes the torsion coil spring 44 to be deformed, as shown in FIG. 8(C). Consequently, the pins 34 and 36 of the lock plates 24 and 25, which rotate together with the take-up shaft 20, are guided by the respective slots 40 of the lock ring 38 so that the pawl portions 28 and 30 engage with the internally-toothed ratchet wheel 32, thereby locking the take-up shaft 20 from rotating in the direction in which the webbing is unwound. As a result, the occupant is reliably restrained by the webbing.

When the vehicle is running on a rough road, the occupant's body moves up and down in response to vibrations of the vehicle body, and the webbing is, therefore, repeatedly unwound from and rewound onto the take-up shaft 20.

In such a case, the conventional retractors encounter the following problem. Namely, when the webbing is rewound onto the take-up shaft 20, the lock ring 38 rotates counterclockwise from the position shown in FIG. 8(C) through an angle corresponding to one or more teeth of the lock ring 38, and when the webbing is unwound subsequently, the pawl lever 70 engages with the lock ring 38 in this position, thus causing the webbing to be gradually wound up onto the take-up shaft 20. More specifically, when the lock tooth 38A of the lock ring 38 is in engagement with the pawl lever 70 in the state shown in FIG. 8(C), if the lock ring 38 is rotated by vibrations of the vehicle, the lock tooth 38B or 38C will engage with the pawl lever 70, and the webbing will thereby be gradullay wound up onto the take-up shaft 20.

In this embodiment, however, as shown in FIG. 8(D), the ratchet wheel 58 is rotated counterclockwise by the force applied through friction from the friction spring 64 which receives the rotational force of the take-up shaft 20 rotating in the direction in which the webbing is wound up. Thus, before the lock ring 38 is rotated in the webbing winding-up direction by the biasing force from the torsion coil spring 44, the back surface 58C of the tooth portion 58B formed on the ratchet wheel 58 causes the pawl lever 70 to be pushed out so as to disengage from the lock ring 38 (in the direction of the arrow F).

In consequence, at the moment the pawl lever 70 separates from the lock ring 38, the ring 38 is rotated clockwise by the biasing force of the torsion coil sping 44, as shown in FIG. 8(E). Therefore, even when the take-up shaft 20 is further rotated in the webbing unwinding direction by vibrations of the vehicle thereafter, the pawl lever 70 reengages with the lock tooth 38A or engages with either the lock tooth 38M or 38N. Accordingly, the take-up shaft 20 is locked at the same position as that in the previous locked state, or locked in a position where the take-up shaft 20 has rotated in the webbing unwinding direction through an angle corresponding to one or more teeth of the lock ring 38, so that there is no risk of the webbing being gradually wound up onto the take-up shaft 20.

Thus, in accorance with this embodiment, even when the vehicle is running on a rough road, the webbing is not gradually wound up onto the take-up shaft 20, and the occupant can, therefore, enjoy comfortable driving.

In addition, when the take-up shaft 20 winds and unwinds the webbing in a normal state, the ratchet wheel 58 rotates. together with the take-up shaft 20 through the frictional force applied by the friction spring 60. There is, therefore, no risk of the friction spring 64 resisting the rotation of the take-up shaft 20 for winding up the webbing, so that it is possible to reduce the resilient force required for winding up the webbing and consequently lessen the pressure applied to the occupant's body from the webbing. It is also possible to reduce the weight of the spiral spring employed to apply force to the take-up shaft 20 for winding up the webbing.

Since there are few opportunities of the friction spring 64 and the ratchet wheel 58 rotating relative to each other, almost no wear can take place in portions of these members which are contacted by each other.

The present invention may be applied to any type of lock mechanism in which, when an emergency situation of the vehicle occurs, the lock ring rotates relative to the take-up shaft, and the lock plates engage with the lock teeth formed on the frame, thereby locking the take-up shaft from rotating in the direction in which the webbing is unwound.

It is a matter of course that the structure of the acceleration sensor in accordance with the present invention in which a ball is employed is not necessarily limitative, and other types of acceleration sensor may be employed.

Although, in this embodiment, the friction spring 64 is employed to apply frictional force to the ratchet wheel 58, other types of friction applying means, such as those shown in FIGS. 9(A) to 9(D), may be employed. These friction applying means will be explained below with reference to FIGS. 9(A) to 9(D).

Figure 9:
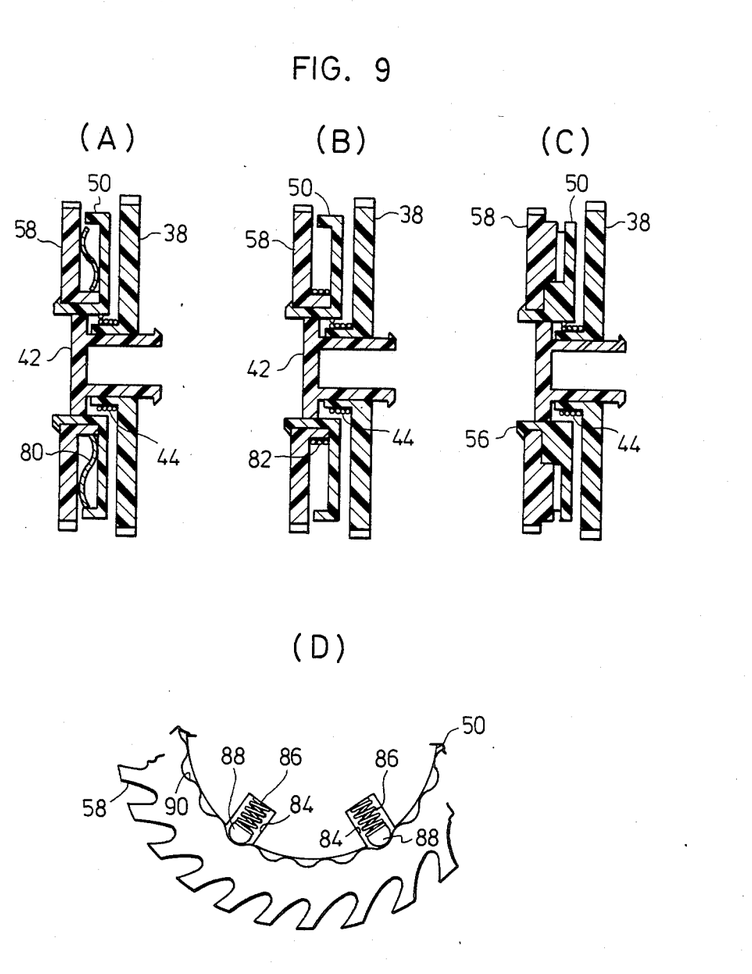

The friction applying means shown in FIG. 9(A) employs a leaf spring 80 which is disposed between the rotor 50 and the ratchet wheel 58, the spring 80 meandering in the direction of the thickness of the ratchet wheel 58.

FIG. 9(B) shows another structure in which, in place of the meandering leaf spring 80, a compression coil spring 82 is interposed in a compressed state.

In both cases, the spring biasing force is applied to the respective end faces of the rotor 50 and the ratchet wheel 58, thereby applying friction to the ratchet wheel 58.

In the structure shown in FIG. 9(C), the rotor 50 and the ratchet wheel 58 are fitted to each other within a predetermined fitting tolerance, and friction is applied to the ratchet wheel 58 through this fitting portion. In this case, the pawls 56 of the rotor 50 which retain the ratchet wheel 58 preferably have resilience by which they are biased so as to expand in the radial direction of the ratchet wheel 58.

FIG. 9(D) shows a structure in which a plurality of bores 84 having a circular cross-section are provided along the outer periphery of the rotor 50, the bores 84 extending in the radial direction of the rotor 50, and a compression coil spring 86 and a ball 88 are inserted into each of the bores 84, while corrugations 90 are formed on the inner periphery of the cylindrical portion 60 of the ratchet wheel 58, so that the ratchet wheel 58 rotates while being intermittently interrupted by the engagement between the balls 88 and the corrugations 90, thus causing friction to occur between the ratchet wheel 58 and the rotor 50.

Figure 10:
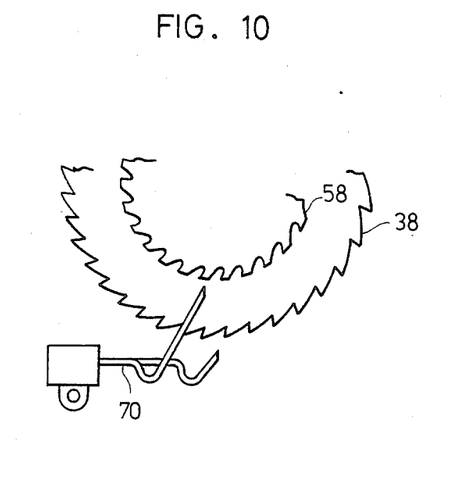
FIG. 10 is a front view of another example of the pawl lever the distal end of which is forked into two portions respectively opposing the ratchet wheel and the lock ring.

Further, the structure of the pawl lever 70, which engages with both the lock ring 38 and the ratchet wheel 58, is not necessarily limited to that exemplified in this embodiment, and a structure such as that shown in FIG. 10 may be employed. More specifically, the pawl lever 70 is forked at the intermediate portion thereof so as to provide two lever end portions which respectively oppose the lock ring 38 and the ratchet wheel 58, and the respective lengths of these lever end portions are appropriately adjusted, whereby it becomes unnecessary to give any consideration to the relationship in terms of radius between the ratchet wheel 58 and the lock ring 38 as in the case of the above-described embodiment. Accordingly, it is possible to set each of the radiuses of the lock ring 38 and the ratchet wheel 58 as desired.

What is claimed is:

1. A lock mechanism for a webbing retractor employed in a seatbelt system for a vehicle designed to protect an occupant in an emergency situation of the vehicle, said mechanism comprising:
   (a) a take-up shaft for winding up said webbing by means of a biasing force;
   (b) a lock ring having teeth thereon and adapted to rotate together with said take-up shaft when rotated in a direction in which said webbing is unwound;
   (c) stopper means adapted to engage with said lock ring when the acceleration acting on the vehicle exceeds a predetermined value, so as to delay the rotation of said lock ring with respect to the rotation of said take-up shaft in the direction in which said webbing is unwound;
   (d) lock means for stopping the rotation of said take-up shaft in the direction in which said webbing is unwound when the rotation of said lock ring has adequately been delayed with respect to the rotation of said take-up shaft; and
   (e) a ratchet wheel to which the rotation of said take-up shaft is transmitted through friction in such a manner that said ratchet wheel is rotatable together with said take-up shaft without applying any resistance to the rotation of said take-up shaft, said ratchet wheel having teeth thereon and being adapted to be engaged with said stopper means when the acceleration acting on the vehicle exceeds a predetermined value and before said stopper means engages with said lock ring, so that, when said ratchet wheel in this state is rotated in the direction in which said webbing is wound up, said ratchet wheel pushes out said stopper means so as to disengage from said lock ring, whereby, even when said webbing is repeatedly unwound and rewound, said lock ring and said stopper means are allowed to engage with each other at a substantially constant position, thereby preventing said webbing from being gradually wound up and tightened.

2. A lock mechanism according to claim 1, wherein said stopper means is a lever which is activated by an acceleration sensor.

3. A lock mechanism according to claim 2, wherein said ratchet wheel is provided with a slanted surface which is adapted for pushing out the distal end of said lever when the rotation of said take-up shaft in the direction in which said webbing is wound up is transmitted to said ratchet wheel.

4. A lock mechanism according to claim 1, wherein said ratchet wheel is disposed coaxially with respect to said lock ring.

5. A lock mechanism according to claim 4, wherein the number of teeth of said ratchet wheel is larger than that of said lock ring.

6. A lock mechanism according to claim 4, wherein the radius of said ratchet wheel, i.e., the distance between the center and a tooth tip of said ratchet wheel is made larger than that of said lock ring.

7. A lock mechanism according to claim 1, wherein said lever is provided at the distal end thereof with a ratchet wheel engaging portion in addition to a lock ring engaging portion.

8. A retractor for winding up a webbing onto a take-up shaft by means of biasing force, said webbing being used to protect an occupant of a vehicle, and said retractor comprising:
(a) a lock ring having teeth thereon with lands therebetween and adapted to rotate together with said take-up shaft when rotated in a direction in which said webbing is unwound;
(b) an acceleration sensor for sensing an acceleration acting on the vehicle;
(c) stopper means activated by said acceleration sensor so as to delay the rotation of said lock ring with respect to said take-up shaft;
(d) lock means for stopping the rotation of said take-up shaft by sensing the rotation delay of said lock ring; and
(e) a gear wheel having teeth thereon with lands therebetween and rotatable together with said take-up shaft and engaged with said stopper means when activated, said gear wheel being adapted to push out said stopper means in the radial direction thereof when said webbing is wound up so that said stopper means is disengaged from said lock ring, whereby, when the vehicle is running on a rough road, said webbing is prevented from being undesirably wound up and tightened.

9. A retractor according to claim 8, wherein said stopper means is a lever which is pushed up by the action of said acceleration sensor.

10. A retractor according to claim 9, wherein said gear wheel is provided with a ratchet surface which is adapted for pushing out said lever when said gear wheel rotates in a direction in which said webbing is wound up.

11. A retractor according to claim 10, wherein a tooth tip of said gear wheel projects outwardly beyond that of said lock ring.

12. A retractor according to claim 8, wherein said lock ring and said gear wheel are coaxially supported on said take-up shaft.

13. A retractor according to claim 8, wherein said gear wheel has a larger number of teeth than that of said lock ring.

14. A retractor according to claim 9, wherein said lock ring and said gear wheel have different sizes from each other, and a plurality of engagement portions of said lever are provided so as to oppose the tooth tips of said lock ring and said gear wheel, respectively.

15. A retractor according to claim 8, wherein said gear wheel is disposed on the outer side than said lock ring as viewed in the axial direction of said take-up shaft.

16. A retractor according to claim 8, wherein the lands of said gear wheel are formed closer to the axial center of said take-up shaft than that of said lock ring.

17. A webbing retractor for use in a seatbelt system for a vehicle designed to protect an occupant in an emergency situation of the vehicle, said retractor comprising:
(a) a frame secured to the body of the vehicle;
(b) a webbing take-up shaft rotatably supported on said frame and adapted to wind up a webbing by means of biasing force;
(c) a lock ring having teeth thereon with lands therebetween and rotatably supported on said take-up shaft;
(d) a resilient member for allowing said lock ring to rotate together with said take-up shaft;
(e) an acceleration sensor for sensing an acceleration acting on the vehicle body;
(f) a lever activated by the action of said acceleration sensor so as to engage with said lock ring in order to delay the rotation of said lock ring with respect to said take-up shaft;
(g) lock means for stopping the rotation of said take-up shaft in a direction in which said webbing is unwound when the rotation of said lock ring is delayed; and
(h) a ratchet wheel having teeth thereon with lands therebetween and rotatably supported on said take-up shaft adjacent to said lock ring and engaged with said lever, said ratchet wheel being adapted to receive the rotational force from said take-up shaft through friction, to rotate together with said take-up shaft when the vehicle is in a normal state, and to push out said lever when said webbing is wound up so that said lever is disengaged from said lock ring, thereby preventing said webbing from being undesirably wound up and tightened when the vehicle is running on a rough road.

18. A webbing retractor according to claim 17, wherein the number of teeth of said ratchet wheel is larger than that of said lock ring.

19. A webbing retractor according to claim 18, wherein a tooth tip of said ratchet wheel radially projects beyond that of said lock ring.

20. A webbing retractor according to claim 17, wherein the lands of said ratchet wheel are formed closer to the axial center of said take-up shaft than that of said lock ring.

* * * * *